United States Patent
Koester, Sr. et al.

(10) Patent No.: US 9,925,701 B2
(45) Date of Patent: Mar. 27, 2018

(54) SANDWICH COMPOSITE ELEMENTS

(71) Applicant: Covestro Deutschland AG, Leverkusen (DE)

(72) Inventors: Ralf Koester, Sr., Leverkusen (DE); Horst-Uwe Jung, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 315 days.

(21) Appl. No.: 14/964,662

(22) Filed: Dec. 10, 2015

(65) Prior Publication Data

US 2016/0144540 A1   May 26, 2016

Related U.S. Application Data

(62) Division of application No. 13/259,481, filed as application No. PCT/EP2010/001639 on Mar. 16, 2010, now Pat. No. 9,242,399.

(30) Foreign Application Priority Data

Mar. 25, 2009   (EP) ...................................... 0900423

(51) Int. Cl.
*B29C 44/32* (2006.01)
*B29C 44/46* (2006.01)
*B29K 75/00* (2006.01)

(52) U.S. Cl.
CPC .......... *B29C 44/326* (2013.01); *B29C 44/461* (2013.01); *B29K 2075/00* (2013.01)

(58) Field of Classification Search
CPC ........................... B29C 44/461; B29C 44/462
See application file for complete search history.

(56) References Cited

U.S. PATENT DOCUMENTS

2007/0267443 A1   11/2007   Rub et al.
2010/0080900 A1    4/2010   Geraedts et al.

FOREIGN PATENT DOCUMENTS

WO   2008018787 A1   2/2008

*Primary Examiner* — Alex A Rolland
(74) *Attorney, Agent, or Firm* — Donald R. Palladino

(57) ABSTRACT

A device for the application of foaming reaction mixtures to a substrate which makes it possible to apply that foaming reaction mixture uniformly, a process for the production of foaming reaction mixtures using this device, apparatus for producing composites which include the device of the present invention and composites produced using such apparatus are disclosed. Use of the device of the present invention to produce foams makes it possible to produce foams having improved surface quality at higher production rates than were previously possible. The device of the present invention is particularly useful for the production of sandwich composite elements.

20 Claims, 1 Drawing Sheet

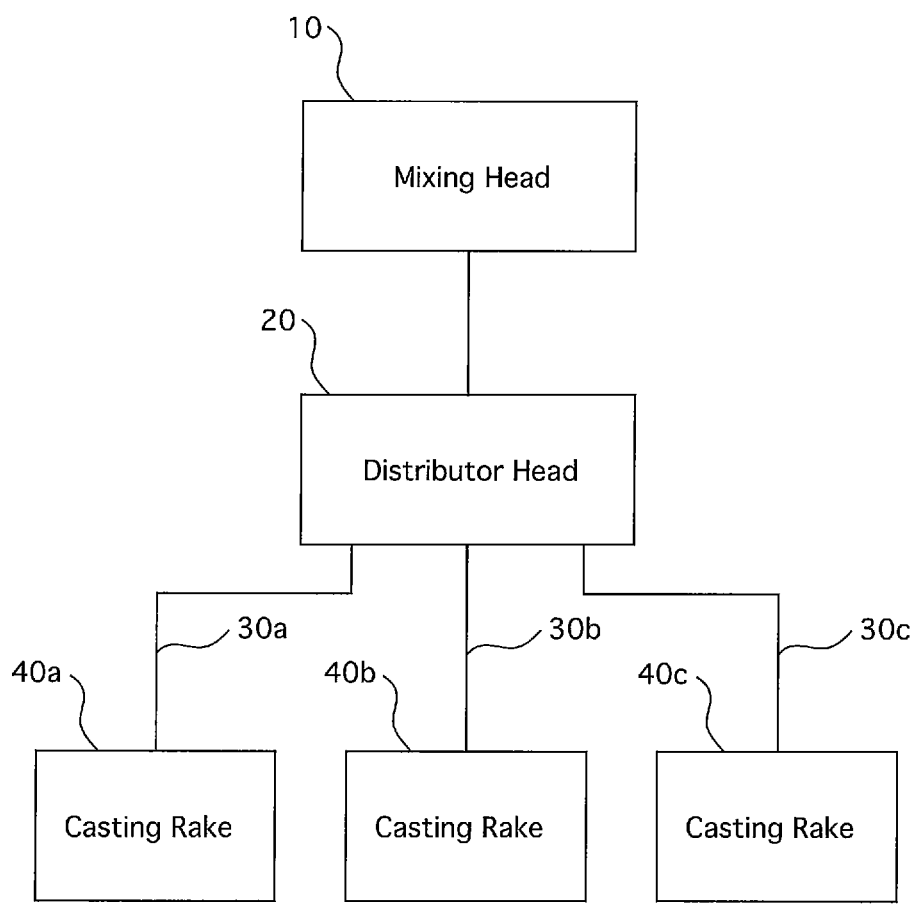

SANDWICH COMPOSITE ELEMENTS

CROSS-REFERENCE TO RELATED APPLICATIONS

This is a Divisional Application of U.S. application Ser. No. 13/259,481, filed Sep. 23, 2011, now U.S. Pat. No. 9,242,399, which was a National Phase Application of PCT/EP2010/001639, filed Mar. 16, 2010, which claims priority to European Application No. 0900423.8, filed Mar. 25, 2009, each of which being incorporated herein by reference.

FIELD

The invention relates to a device for the optionally simultaneous and optionally uniform application of foaming reaction mixtures to a substrate, to a process for the production of foaming reaction mixtures, to a device for the production of sandwich composite elements, and to a process for the production of foamed sandwich composite elements.

BACKGROUND

There has long been a need for devices for the continuous production of sandwich composite elements at high production rates. Oscillating mixing heads have hitherto been known from the prior art for the continuous production of sandwich composite elements. The mixing head performs an oscillating movement over the width of a lower outer layer and applies the still liquid reaction mixture to the lower outer layer by means of a casting rake or fan/spoon nozzle which is arranged at a right angle relative to the mixing head and parallel to the lower outer layer.

The mixing head is fixed to a guide rail, the so-called portal, above the lower outer layer and is accelerated with the aid of electric motors and slowed down before the reversal points. The raw materials for foaming are fed to the mixing head via flexible hose lines. Furthermore, in some cases hydraulic or pneumatic hoses lead to the mixing head. The raw materials for foaming are introduced into the mixing head via nozzles and are mixed.

The reaction mixture then flows into the casting rake and emerges through regularly spaced bores. As a result of the length of the casting rake and its bores, as well as the oscillating movement of the mixing head, distribution of the reaction mixture obliquely to the production direction is achieved.

After application, the reaction mixture foams and rises to the upper outer layer. During the foaming process it bonds the two outer layers before the foam solidifies and cures.

This production process is limited in terms of manufacturing technology as regards the production rate. Even if sufficiently strong motors, guide rails, hoses, mixing heads and casting rakes or fan/spoon nozzles were used, the reaction mixture would be carried beyond the edges of the outer layers at the reversal points owing to excessively high centrifugal forces. According to the prior art, production rates of more than 15 m/minute cannot be achieved in the continuous production of sandwich composite elements with this application technique.

The technique of increasing the production rate to up to 60 m/minute by means of stationary mixing head technology and rigid delivery systems is sufficiently well known. This process is called US technology. US technology (high-speed machines) consists substantially of three identical metering lines with separate feed and separate mixing heads and delivery systems. However, this technology does not have a distributor head. This process further has the disadvantage that the reaction mixture emerging from each of the individual mixing heads can also be subject to different physical conditions as regards pressure and temperature, and this manifests itself in the resulting foam as reductions in product quality, such as, for example, uneven surface, smaller cells, different thermal conductivity values due to punctually different reaction kinetics.

EP 1 857 248 A2 solves that problem by not providing every discharge line with a separate mixing head. Rather, only a central mixing head is provided, via which a plurality of delivery lines are fed.

WO 2008/018787 A1 relates to a device for applying a viscous mixture to a surface by means of one or more outlet openings which are fed by a feed element. The specification relates further to a process for the production of an insulating element, comprising the steps of applying a viscous mixture which forms a foam on a substrate layer, the foam subsequently being crosslinked and the foam layer optionally being further coated. A mixing head 3 is supplied with raw material with components from supply pipes 1 and 2. Via a rigid main pipe 8, a casting rake 6 is controlled by a plurality of intermediate webs 5 via a sub-distributor 4. The casting rake is accordingly rigidly connected to the mixing head and can only be moved to the left or right together with the mixing head in order to allow the application region to be adjusted as a whole to the correct position relative to the substrate. Moreover, cleaning of the system is very complex.

WO 2008/104492 A2 discloses a process for the production of composite elements, wherein the application of the liquid starting material for the isocyanate-based rigid foam is carried out by means of a stationary pipe which is arranged parallel and at a right angle to the direction of movement relative to the outer layer and is provided with bores.

SUMMARY OF THE INVENTION

In view of that prior art, the object of the present invention is to develop devices and processes with which a high production rate can be achieved with a low layer thickness. A further object is to improve the surface (especially as regards its homogeneity) as well as the above-defined product qualities of the foams obtainable using such devices/processes.

That object is achieved in a first embodiment by a device for applying foaming reaction mixtures, comprising
  (a) a mixing head for mixing raw materials for the production of the foam,
  (b) a distributor head located behind the mixing head in terms of flow,
  (c) at least two, preferably at least three, particularly preferably from three to eight, most preferably three or four, flexible hose lines attached to the distributor head, and
  (d) at least two, preferably from two to eight, particularly preferably three or four, stationary casting rakes for applying the mixture of raw materials for forming the foam to a moving substrate.

BRIEF DESCRIPTION OF THE DRAWINGS

FIG. 1 is a schematic illustration of the foregoing components of the device used in Example 3.

DETAILED DESCRIPTION

When the distributor head is described in this connection as being located behind the mixing head, this is to be understood in relation to the direction of flow of the material flowing through the two heads; that is to say, the material flows first through the mixing head and only then through the distributor head.

For processing of the raw material there is used in particular an inert gas selected from the group air, nitrogen, carbon dioxide and noble gases such as argon and helium. Air is preferably used as chemically inert gas.

Depending on the technology used (high-pressure or low-pressure), the mixing head can be in the form of a dynamic mixer or in the form of a static mixer and serves in particular to intimately mix the component in question, or the mixture, with the inert gas that is under elevated pressure. After introduction of the inert gas, the components on their way to the distributor head, or the mixture of components on its way to the mixing head, has/have an elevated pressure, which causes an increased discharge rate of the foaming reaction mixture. In addition, the above-mentioned product qualities are improved.

The casting rakes used according to the invention each have a tube-like shape and are each provided with holes distributed over the entire length of the rake, and the holes are preferably oriented so that they are at an angle of from 75° to 105°, particularly preferably at a right angle (90°), relative to the lower outer layer. The reaction mixture is fed to the casting rake either at one end of the rake or in the middle or in a region in between.

In a preferred embodiment of the present invention, the casting rakes are arranged in a stationary manner transversely, in particular at an angle of 90°, to the production direction of the substrate. The stationary arrangement of the casting rake has the advantage that the density is not changed at the edges of the applied foam as compared with other areas of the applied foam. Accordingly, the foam application is continuously extremely even over the entire width of the substrate.

The casting rakes can also be arranged transversely in an offset manner in the production direction of the substrate, or they can be located next to one another in a line. In the case of an offset arrangement, overlapping of the casting rakes can lead to a lengthwise application gradient with a stepped pattern.

The casting rakes that are preferably used within the scope of the present invention have on the inside a conical flow cross-section which tapers from the reaction mixture inlet to the furthermost bore, so that the flow pressure upstream of the outlet openings can be equalised.

Analogously to the prior art, the casting rakes used according to the invention each preferably have a conical inner cross-section in the region of the outlet opening of the foaming reaction mixture. Accordingly, the casting rakes correspond substantially to one-way casting rakes known per se which have hitherto been used in the prior art for the oscillating application method.

In a second embodiment, the object underlying the invention is achieved by a process for the production of foaming reaction mixtures using a device according to the invention.

There is preferably used as component A an isocyanate component. There is preferably used as component B a polyol component. In this connection, the expressions "isocyanate component" and "polyol component" also include mixtures of different isocyanates and polyols, respectively. Polyurethane foams are thus obtained. In the presence of specific activators, isocyanates can also react with one another and form macromolecules having isocyanurate structures (polyisocyanurates=PIR). Because the reactions of isocyanates with polyols and isocyanates can take place simultaneously or in immediate succession, macromolecules having urethane and isocyanurate structures (PIR-PUR) are obtained.

In the process according to the invention, the casting rakes are preferably so arranged that the emerging foaming reaction mixture is applied to a lower outer layer in the production direction of the substrate (direction of movement of the substrate).

Alternatively, the casting rakes are so fixed in the process according to the invention that the emerging foaming reaction mixture is applied to a lower outer layer against the production direction of the substrate.

In both cases that is achieved by appropriately inclining the casting rake bores at an angle of from 45 to 135° relative to the substrate.

In a further preferred embodiment of the present invention, the device comprises at least two, preferably at least three, particularly preferably from three to eight, most preferably three or four, flexible hose lines of equal cross-section, of equal length and made of the same material which are attached to the distributor head. It is thereby ensured that the same amount of raw material per unit time is introduced into the casting rakes (at least two, preferably at least three, particularly preferably from three to eight, most preferably three or four) and accordingly also applied to the substrate.

In a further embodiment, the object underlying the invention is achieved by a device for the production of sandwich composite elements comprising at least two feed devices for in each case an upper and a lower outer layer, a revolving upper belt for guiding the upper outer layer and a revolving lower belt for guiding the lower outer layer, on which there are arranged one behind the other a device according to the invention, a moulding section and a cutting device.

The invention further provides a process for the production of foamed sandwich composite elements, wherein a device according to the invention for the production of sandwich composite elements is used.

In the device according to the invention, a mixing head is preferably attached to a rigid frame above the lower outer layer, so that different reaction profiles for the production of products of different thicknesses are possible. To the mixing head, in which the individual components for foaming are mixed together, there is fixed a distributor head. The distributor head has, for example, at least two, preferably at least three, particularly preferably from three to eight, most preferably three or four, flexible hose lines whose length, cross-section and material are preferably all identical. This has the advantage that the foaming behaviour of the still liquid reaction mixture when it later comes into contact with the lower outer layer has progressed equally as far at each point of contact, which results in particularly uniform foaming of the product that is produced. This advantage is assisted not only by the identical length, cross-section and material of the flexible hose lines but also by the fact that all the mixture that is to be applied emerges from the same mixing head. There can be used as the flexible hose line any material known to the person skilled in the art that does not react with the reaction mixture to be foamed and to which the reaction mixture does not adhere too greatly. The material of the flexible hose line is preferably selected from the group polyethylene (PE), polypropylene (PP), polyvinyl chloride (PVC), polyethylene terephthalate (PET), rubber, polytetrafluoroethylene (PTFE) and polyurethane (PU). Rubber is to be understood as being any flexible rubber known to the person skilled in the art that can be processed to feed lines; nitrile-butadiene rubber (NBR) is preferred. Particular preference is given to a flexible material selected from the group PE, PP, PET and PVC. The flexible hose lines can be arranged on and fixed to a rigid frame arranged in the transverse direction to the production direction of the transport belt above the upper outer layer, so that they supply the casting rakes optimally with the reaction mixture and uniform application over the width of the lower outer layer is ensured. The flexible hose lines and the casting rakes are advantageously arranged at a height of from 20 to 500 mm above the lower outer layer and preferably in such a manner that the reaction mixture is applied to the lower outer layer in such a manner that no unwetted areas occur on the lower outer layer between the individual application areas of each of the casting rakes.

The discharge rate from the casting rakes is in particular from 1 to 5 m/second. In a particular embodiment, both the mixing head and the distributor head, including the flexible hose lines, can be so arranged and fixed that it is also possible to produce products having a thickness that decreases in the transverse direction to the production direction of the transport belt or having constantly changing thickness ratios. This can substantially be achieved by an appropriate configuration of the casting rakes. During foaming, those gaps between the bores close, so that desired uneven foaming in the height of the products is possible.

As a result of this type of arrangement, a portal as is essential in the case of an oscillating casting rake or fan/spoon nozzle can be omitted. Furthermore, with this arrangement, the production rates are dependent only on the speed of the transport belt or the discharge rate of the foaming machine and on the cross-section of the bores of the casting rakes. A further advantage of this device according to the invention as compared with processes in which a plurality of mixing heads must be used is that, by the use of only one mixing head, no variations can occur as a result of different processing pressures, temperatures or the like, as a result of which the production safety and product quality are reduced.

Any mixing head known in the prior art can be used as the mixing head for the device according to the invention. However, they must be suitable for the foaming in particular of the polyol component and the isocyanate component for the production of polyurethane sandwich composite elements. The chemically inert gas can be mixed with the reaction mixture in the mixing head or with one or both of the reaction components beforehand in order to prevent possible clogging of the flexible hose lines. The chemically inert gas is selected from the group nitrogen, air, carbon dioxide and noble gases such as argon and helium. Instead of a gas, other constituents can be mixed with the reaction components. Such substances are selected, for example, from the group graphite, polyurethane flour, melamine, quartz sand, $Al_2O_3$, talcum, and nanocomposites such as, for example, layered silicates, nanotubes, and nanosand, and are added to the reaction components in particular in the mixing head.

The material of the distributor head can be selected from the same material as the casting rakes, in particular from steel, stainless steel, aluminium and plastics materials. In each case, the chosen material must withstand the usual pressures and temperatures in the range of from 20 to 40° C. that prevail in the mixing head. The geometry of the distributor head is preferably so chosen that the length of the path from the distributor inlet to the respective outlets of the flexible hose lines to the bores of the casting rakes is equal. Furthermore, it is advantageous for the cross-sections of the distributor head outlets to be identical for all the distributor head outlets. The cross-section of the distributor head inlet, on the other hand, can also be larger than the respective distributor head outlets.

The application device according to the invention can be a constituent of a further device which is used for the production of sandwich composite elements. The production of polyurethane sandwich elements (panels) is generally carried out in a continuous process. In that process, the panels are produced continuously on so-called twin transport belts in thicknesses of generally approximately from 20 to 240 mm. Thicknesses below 20 mm and above 240 mm are, however, also possible. Such a twin transport belt usually consists of a revolving upper belt for guiding the upper outer layer, a revolving lower belt for guiding the lower outer layer, a feed device for the upper outer layer, a feed device for the lower outer layer, a moulding section in which the polyurethane reaction mixture foams and reacts between the upper outer layer and the lower outer layer, a cutting device for the panel that has been produced, as well as a metering station having a mixing head for applying the polyurethane reaction mixture to the lower outer layer.

The arrangement of the individual elements for a continuous process for the production of sandwich composite elements is known from the prior art, as described in DE 1 247 612 A1 and DE 1 609 668 A1.

Within the context of the present invention, a sandwich composite element is understood as being a composite element which is composed at least of two outer layers and an intermediate core layer.

Any materials known to the person skilled in the art can be used as the core layer. Preference is given to fibreboards made of mineral fibres or sheets of rigid foam, such as, for example, rigid polyurethane or polyisocyanurate (PIR) foam, polystyrene foam, phenolic resin foam.

In particular, sandwich composite elements consist at least of two outer layers of rigid or flexible material and a core layer of a foam, such as, for example, a rigid PUR foam. Rigid PUR foams are here to be understood as being rigid foams based on polyurethane compounds, polyurea compounds as well as polyisocyanurate compounds.

There are preferably chosen as the core layer rigid foams based on polyurethane and/or polyisocyanurate. For the production of rigid foams containing polyurethane groups and/or polyisocyanurate groups there can be used as starting components any compounds known to the person skilled in the art having NCO-containing compounds that are reactive towards OH compounds, such as a) aliphatic, cycloaliphatic, araliphatic, aromatic and heterocyclic polyisocyanates, preferably diphenylmethane diisocyanate (MDI) or polyphenylpolymethylene polyisocyanates, polyisocyanates containing carbodiimide groups, urethane groups, allophanate groups, isocyanurate groups, urea groups or biuret groups, particularly preferably based on polyphenylpolymethylene polyisocyanate, and b) compounds containing at least two hydrogen atoms reactive towards isocyanates and having a molecular weight in the range from 400 to 10,000 g/mol, such as, for example, compounds containing amino groups, thiol groups, hydroxyl groups or carboxyl groups.

Moreover, it is possible to use suitable NCO prepolymers, prepared from the reaction of polymeric MDI with aliphatic or aromatic polyether polyols or polyester polyols, for example polyether polyols or polyester polyols containing from 1 to 4 hydroxyl groups and having a number-average molecular weight of from 60 to 4000.

The production of the foams takes place using conventional auxiliary substances and additives known to the person skilled in the art, such as catalysts, foaming agents, crosslinkers, flameproofing agents, foam stabilisers, flow improvers, inhibitors, as well as optionally solid additives for improving the thermal conductivity and the flame protection.

As materials for the outer layers there can be used any materials known to the person skilled in the art. Preference is given to metals, such as steel (galvanised and/or lacquered), aluminium (lacquered and/or anodised), copper, stainless steel, or non-metals such as reinforced, non-reinforced and/or filled plastics materials, such as, for example, polyvinyl chloride or polyester- or glass-fibre-based, impregnated cardboard, paper, wood, bitumen-impregnated glass nonwoven and mineral glass nonwoven.

For example, the outer layers can be coated with a lacquer.

Also suitable as outer layers are combinations of the outer layers on the respective sides of the panel produced from the above-mentioned materials.

Such composite elements based on different outer layers (rigid or flexible) and a core layer of rigid polyurethane foam are sufficiently well known from the prior art and are also referred to as metal composite elements or insulating boards. Further layers can be provided between the core layer and the outer layers.

Examples of the application of such composite elements having rigid outer layers are flat or lined wall elements as well as profiled roof elements for the construction of factory buildings and refrigerated warehouses. The composite elements are also used as truck superstructures, warehouse doors and gates as well as in container construction. Insulating boards as well as composite elements having flexible outer layers are used as insulating materials for roofs, outside walls and as flooring panels.

The production of such composite elements by a continuous or discontinuous process is sufficiently well known from the prior art. To that end, the still liquid reaction mixture is applied to the lower outer layer (substrate) by means of the device according to the invention. The reaction mixture, which is now slowly foaming, is transported on the lower outer layer by means of a lower belt into the moulding section, which is spanned by an upper belt and a lower belt. The foaming reaction mixture reaches the upper outer layer and accordingly bonds the two outer layers to one another. Within the moulding section, wherein the upper belt and the lower belt define the thickness of the product that is to be produced, the foam solidifies and, after passing through the moulding section, is cut to length by a cutting device for cutting the panels so produced to desired lengths.

EXAMPLES

The homogeneity of the surface is classified by determining the fault density. To that end, the size and number of blisters on the upper side of the foam is determined in an area measuring 200 mm×1000 mm and the fault density is thereby defined as follows:

The blisters are subdivided into four size categories:

| Blister category 1 | Blisters having a surface area of up to about 1 cm$^2$ |
| Blister category 2 | Blisters having a surface area of approximately from 1 to 3 cm$^2$ |

-continued

| Blister category 3 | Blisters having a surface area of approximately from 3 to 5 cm$^2$ |
| Blister category 4 | Blisters having a surface area of approximately ≥5 cm$^2$ |

Comparison Example 1

Fault density of the upper sides of the foam in metal composite elements produced using an oscillating casting rake.

Comparison Example 2

Fault density of the upper sides of the foam in metal composite elements produced using a device comprising a mixing head, a distributor head located behind the mixing head in terms of flow, eight discharge lines attached to the distributor head, which are fastened transversely to the outflow direction on a frame that is rigid (i.e. a device without a casting rake).

Example 3 (According to the Invention)

Fault density of the upper sides of the foam in metal composite elements produced using a device comprising a mixing head (10), a distributor head (20) located behind the mixing head in terms of flow, three flexible hose lines (30a, 30b, 30c) attached to the distributor head, and three stationary casting rakes (40a, 40b, 40c) for applying the mixture of raw materials for forming the foam to a moving substrate. FIG. 1 is a schematic illustration of the foregoing components of the device used in this Example.

The following result shown in Table 1 was determined by means of in each case twenty series of tests relating to the respective processes for producing metal composite elements using a commercially available rigid polyurethane foam system.

TABLE 1

Fault density of the upper sides of the foam in metal composite elements

| | Example | | |
|---|---|---|---|
| | 1 (comparison) Oscillating casting rake | 2 (comparison) 8 lines, without a casting rake | 3 3 lines and 3 stationary casting rakes |
| Blister category | Amount [%] | Amount [%] | Amount [%] |
| 1 | 2-3 | 2-3 | 1-2 |
| 2 | 5-7 | 4-5 | 1-2 |
| 3 | 10-15 | 2-3 | <1 |
| 4 | 2-3 | 1 | <1 |

What is claimed is:
1. A process comprising:
applying a foaming reaction mixture to a moving substrate with a device comprising:
(a) a mixing head for mixing raw materials to produce the foaming mixture,
(b) a distributor head located behind the mixing head in a manner such that the foaming mixture flows from the mixing head to the distributor head,
(c) at least two flexible hose lines attached to the distributor head, and

(d) at least two stationary casting rakes connected to the flexible hose lines for receiving foaming mixture from the hose lines and for applying the foaming mixture to the moving substrate.

2. The process of claim 1, in which at least one isocyanate component (component A) is used as raw material for the foam.

3. The process of claim 1, in which at least one polyol component (component B) is used as raw material for the foam.

4. The process of claim 1 in which the device comprises:
at least three flexible hose lines attached to the distributor head, and
at least three stationary casting rakes for applying the foaming mixture to the moving substrate.

5. The process of claim 1, in which the casting rakes are arranged transversely to the production direction of the substrate.

6. The process of claim 1, in which the arrangement of the casting rakes is offset in the direction of the substrate.

7. The process of claim 1, in which the casting rakes are located next to one another in a line transverse to the direction of the substrate.

8. The process of claim 1, in which the casting rakes have a conical inner cross-section near an outlet opening for the foaming mixture.

9. The process of claim 1, in which the casting rakes have an internal conical cross-section from the foaming mixture inlet to the casting rakes' furthermost bore.

10. The process of claim 1, in which there are at least three flexible hose lines of equal cross-section and of equal length that are made of the same material which are attached to the distributor head.

11. A process for producing a sandwich composite element, comprising:
(a) feeding an upper and a lower outer layer using at least two feed devices;
(b) applying a foaming reaction mixture to the lower outer layer with a device comprising:
(1) a mixing head for mixing raw materials to produce the foaming mixture,
(2) a distributor head located behind the mixing head in a manner such that the foaming mixture flows from the mixing head to the distributor head,
(3) at least two flexible hose lines attached to the distributor head, and
(4) at least two stationary casting rakes connected to the flexible hose lines for receiving foaming mixture from the hose lines and for applying the foaming mixture to the lower outer layer; and
(c) allowing the foaming reaction mixture to contact the upper outer layer to form the sandwich composite element.

12. The process of claim 11, in which at least one isocyanate component (component A) is used as raw material for the foam.

13. The process of claim 11, in which at least one polyol component (component B) is used as raw material for the foam.

14. The process of claim 11 in which the device comprises:
at least three flexible hose lines attached to the distributor head, and
at least three stationary casting rakes for applying the foaming mixture to the lower outer layer.

15. The process of claim 11, in which the casting rakes are arranged transversely to the feed direction of the lower outer layer.

16. The process of claim 11, in which the arrangement of the casting rakes is offset in the feed direction of the lower outer layer.

17. The process of claim 11, in which the casting rakes are located next to one another in a line transverse to the feed direction of the lower outer layer.

18. The process of claim 11, in which the casting rakes have a conical inner cross-section near an outlet opening for the foaming mixture.

19. The process of claim 11, in which the casting rakes have an internal conical cross-section from the foaming mixture inlet to the casting rakes' furthermost bore.

20. The process of claim 11, in which there are at least three flexible hose lines of equal cross-section and of equal length that are made of the same material which are attached to the distributor head.

* * * * *